(12) United States Patent
Nakamura (10) Patent No.: US 11,205,424 B2
(45) Date of Patent: Dec. 21, 2021

(54) CONVERSATION APPARATUS, ROBOT, CONVERSATION APPARATUS CONTROL METHOD, AND NON-TRANSITORY COMPUTER-READABLE RECORDING MEDIUM

(71) Applicant: CASIO COMPUTER CO., LTD., Tokyo (JP)

(72) Inventor: Kazuhisa Nakamura, Akiruno (JP)

(73) Assignee: CASIO COMPUTER CO., LTD., Tokyo (JP)

(*) Notice: Subject to any disclaimer, the term of this patent is extended or adjusted under 35 U.S.C. 154(b) by 220 days.

(21) Appl. No.: 16/414,850

(22) Filed: May 17, 2019

(65) Prior Publication Data

US 2019/0362723 A1 Nov. 28, 2019

(30) Foreign Application Priority Data

May 24, 2018 (JP) .............................. JP2018-099332

(51) Int. Cl.
*G10L 15/22* (2006.01)
*G10L 25/63* (2013.01)
*G10L 17/02* (2013.01)
*G10L 17/00* (2013.01)

(52) U.S. Cl.
CPC .............. *G10L 15/22* (2013.01); *G10L 17/00* (2013.01); *G10L 17/02* (2013.01); *G10L 25/63* (2013.01)

(58) Field of Classification Search
CPC ...................................................... G10L 15/22
See application file for complete search history.

(56) References Cited

U.S. PATENT DOCUMENTS

| 6,144,938 A * | 11/2000 | Surace ................. G10L 13/033 704/257 |
|---|---|---|
| 2016/0042749 A1* | 2/2016 | Hirose ................... G10L 15/22 704/270.1 |
| 2017/0337921 A1* | 11/2017 | Aoyama ................ G10L 15/26 |
| 2018/0089175 A1* | 3/2018 | Matsuoka ......... H04M 1/72457 |
| 2019/0019511 A1* | 1/2019 | Kawano ................ G10L 15/00 |
| 2019/0027142 A1* | 1/2019 | Iwanami ................ H04L 67/04 |
| 2019/0164544 A1* | 5/2019 | Friedman ............... G10L 15/08 |
| 2019/0223798 A1* | 7/2019 | Eriguchi ............... A61B 5/681 |
| 2019/0266999 A1* | 8/2019 | Chandrasekaran ...... G09B 5/00 |
| 2019/0348023 A1* | 11/2019 | Kwon .................... G10L 15/16 |
| 2020/0005786 A1* | 1/2020 | Saito ..................... G10L 25/63 |
| 2020/0013402 A1* | 1/2020 | Kawano ................. G06F 3/013 |
| 2020/0143806 A1* | 5/2020 | Sreedhara .......... G06K 9/00315 |
| 2020/0202856 A1* | 6/2020 | Ivanov Bonev ........ G10L 15/08 |
| 2020/0312317 A1* | 10/2020 | Kothari ................. G06F 1/3203 |

FOREIGN PATENT DOCUMENTS

JP 2016006607 A 1/2016

* cited by examiner

*Primary Examiner* — Douglas Godbold
(74) *Attorney, Agent, or Firm* — Holtz, Holtz & Volek PC (57) ABSTRACT

A conversation apparatus includes an audio speaker and a processor. The audio speaker makes an utterance to users. The processor acquires a feature of each of the users, selects, based on the acquired feature of each of the users, a target user to tune to or to not tune to from among the users, and executes utterance control that controls the audio speaker so as to make an utterance that corresponds to the selected target user.

6 Claims, 10 Drawing Sheets

| USER ID | DATA ITEM NAME | | DATA VALUE | ANALYSIS COUNT |
|---|---|---|---|---|
| User_1 | PERSONAL INFORMATION | NAME | HANAKO | — |
| | | VOICE PRINT |  | — |
| | | FACIAL IMAGE |  | — |
| | | ⋮ | ⋮ | ⋮ |
| | PERSONALITY INFORMATION | CALMNESS | 1 | 23 |
| | | HONESTY | 1 | 23 |
| | | ⋮ | ⋮ | ⋮ |
| | INTEREST INFORMATION | HOBBIES, PREFERENCES, PRINCIPLES | SOCCER LEAGUE, TEAM A, SOAP OPERAS, ENTERTAINMENT SHOWS... | — |
| | | ⋮ | ⋮ | ⋮ |
| User_2 | PERSONAL INFORMATION | NAME | TARO | — |
| | | VOICE PRINT |  | — |
| | | FACIAL IMAGE |  | — |
| | | ⋮ | ⋮ | ⋮ |
| | PERSONALITY INFORMATION | CALMNESS | 10 | 18 |
| | | HONESTY | 8 | 18 |
| | | ⋮ | ⋮ | ⋮ |
| | INTEREST INFORMATION | HOBBIES, PREFERENCES, PRINCIPLES | SOCCER LEAGUE, TEAM B, MUSIC, GUITAR, BAND A... | — |
| | | ⋮ | ⋮ | ⋮ |
| ⋮ | ⋮ | ⋮ | ⋮ | ⋮ |

FIG. 3

HANAKO

1. TARO,
WHAT ARE YOU DOING?
WHY DIDN'T YOU GET THE
SENIOR CITIZEN DISCOUNT?

100

CONVERSATION
APPARATUS

TARO

2. HANAKO,
I COULDN'T.
I CAN'T LIE.

FIG. 4

TARO
1. TEAM B IS GOING TO WIN THE SOCCER LEAGUE GAME TOMORROW.

100
CONVERSATION APPARATUS

2. NO WAY.
TEAM A IS GOING TO WIN.
HANAKO

| APPARATUS ID | DATA ITEM NAME | | DATA VALUE |
|---|---|---|---|
| Robot_1 | PERSONAL INFORMATION | NAME | ROBOTA |
| | | AGE | 12 |
| | | ⋮ | ⋮ |
| | PERSONALITY INFORMATION | CALMNESS | 8 |
| | | HONESTY | 6 |
| | | KINDNESS | 9 |
| | | COMPASSION | 9 |
| | | ⋮ | ⋮ |
| | INTEREST INFORMATION | HOBBIES, PREFERENCES, PRINCIPLES | SOCCER LEAGUE, BASEBALL, QUIZ SHOWS... |
| | | ⋮ | ⋮ |

FIG. 10

CONVERSATION APPARATUS, ROBOT, CONVERSATION APPARATUS CONTROL METHOD, AND NON-TRANSITORY COMPUTER-READABLE RECORDING MEDIUM

CROSS-REFERENCE TO RELATED APPLICATION

This application claims the benefit of Japanese Patent Application No. 2018-099332, filed on May 24, 2018, the entire disclosure of which is incorporated by reference herein.

FIELD

This application relates generally to a conversation apparatus, a robot, a conversation apparatus control method, and a non-transitory computer-readable recording medium.

BACKGROUND

Advances have been made in the development of technologies capable of facilitating communication between users. For example, Unexamined Japanese Patent Application Kokai Publication No. 2016-006607 describes a conversation-type communication system that monitors the state of a conversation taking place between users and, when the conversation becomes stagnated, provides a topic of conversation that is of interest to the users.

SUMMARY

A conversation apparatus includes:
an audio speaker configured to make an utterance to users; and
a processor configured to
acquire a feature of each of the users,
select, based on the acquired feature of each of the users, a target user to tune to or to not tune to from among the users, and
execute utterance control that controls the audio speaker so as to make an utterance that corresponds to the selected target user.

BRIEF DESCRIPTION OF THE DRAWINGS

A more complete understanding of this application can be obtained when the following detailed description is considered in conjunction with the following drawings, in which.

DETAILED DESCRIPTION

Hereinafter, conversation apparatuses according to embodiments of the present disclosure are described while referencing the drawings and tables. Note that, in the drawings, identical or corresponding components are marked with the same reference numerals.

Embodiment 1

A conversation apparatus according to the present embodiment listens to a conversation between users, acquires features of each of the users, selects, on the basis of the features of each of the users, a target user to tune to from among the users, and makes an utterance as if tuning to the target user. The term "tune" means to agree with the opinion of the selected target user. The conversation apparatus makes utterances that correspond to the hobbies, preferences, ways of thinking, opinions, and the like of the target user by making utterances as if tuning to the target user. As described above, the conversation apparatus according to this embodiment of the present disclosure makes utterances tuned to a certain user, thereby imparting an impression that the conversation apparatus has opinions and feelings and is participating in the conversation between the users. As a result, the conversation apparatus can enliven the conversation between the users. Note that the term "user" does not only refer to a person that intentionally and purposefully uses the conversation apparatus 100. All people near the conversation apparatus 100 are users of the conversation apparatus 100, regardless of intention and purpose of use. Typically, people converse near the conversation apparatus 100 and, as such, the conversation apparatus 100 ends up being used by users.

Figure 1:
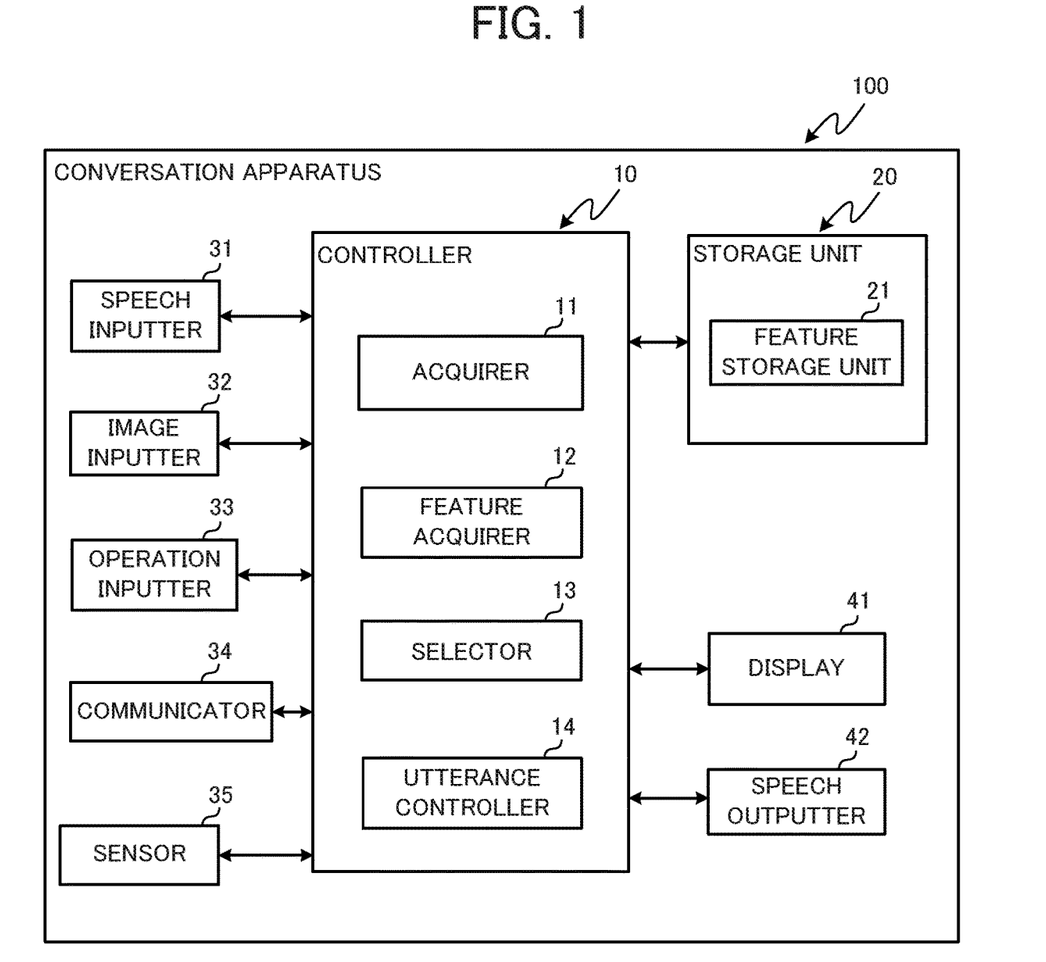
FIG. 1 is a drawing illustrating the functional configuration of a conversation apparatus according to Embodiment 1 of the present disclosure.

As illustrated in FIG. 1, the conversation apparatus 100 according to Embodiment 1 of the present disclosure includes, as functional components, a controller 10, a storage unit 20, a speech inputter 31, an image inputter 32, an operation inputter 33, a communicator 34, a sensor 35, a display 41, and a speech outputter 42. While not illustrated in FIG. 1, in one example, the conversation apparatus 100 is mounted on a robot. This robot may include a driver for moving around, thereby providing the robot with a function to move to near the user.

The controller 10 is configured from a central processing unit (CPU) or the like. The controller 10 executes a program stored in the storage unit 20 to realize the functions of the hereinafter described components (an acquirer 11, a feature acquirer 12, a selector 13, and an utterance controller 14).

The storage unit 20 is configured from read-only memory (ROM), random access memory (RAM), or the like. The ROM is configured in part or in whole from electrically rewritable memory (flash memory or the like). Functionally, the storage unit 20 includes a feature storage unit 21 Programs to be executed by the CPU of the controller 10 and data needed in advance to execute these programs are stored in the ROM. Data that is created or modified during the execution of the programs is stored in the RAM.

Figure 2:
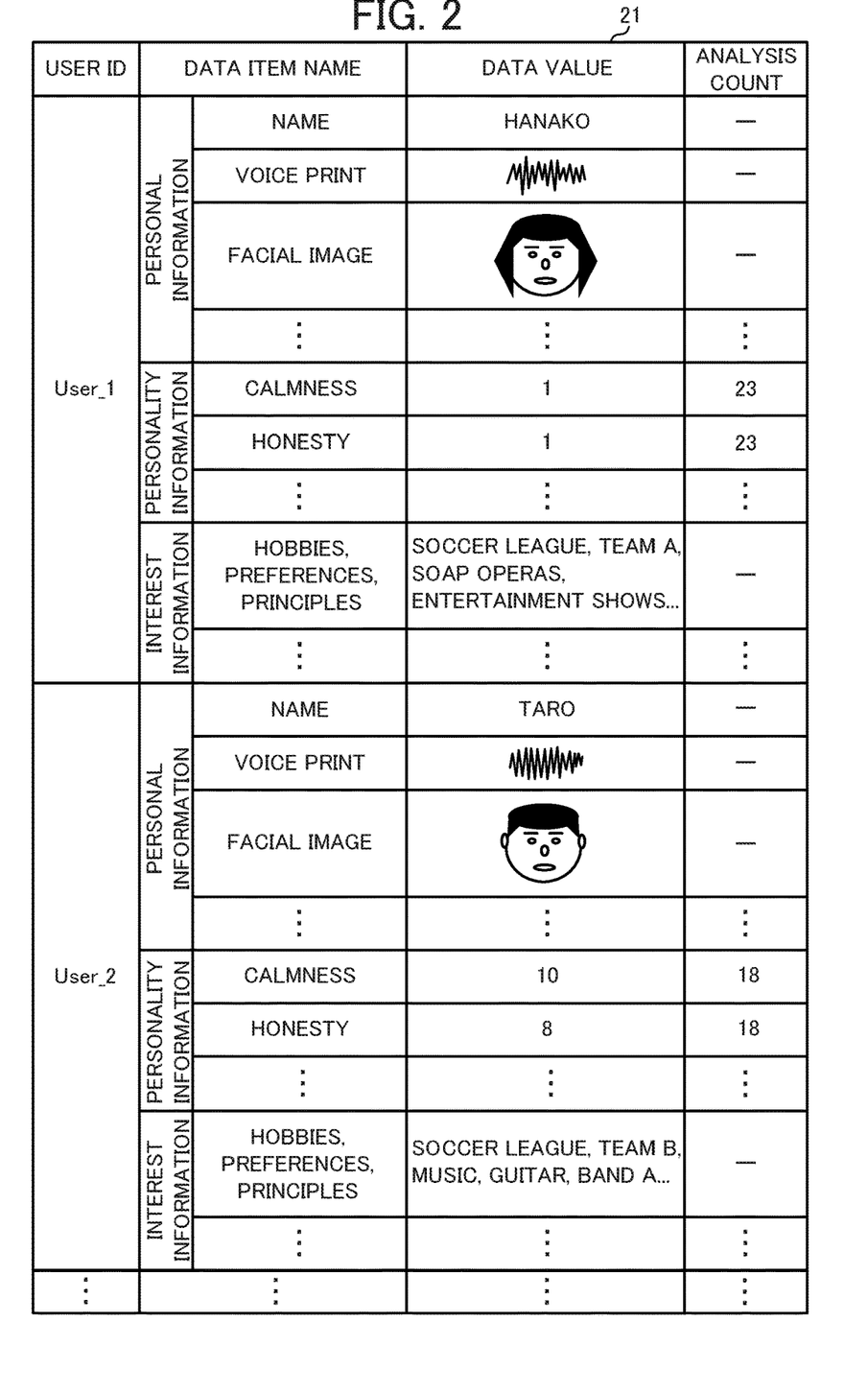
FIG. 2 is a drawing illustrating an example of data stored in a feature storage unit of the conversation apparatus according to Embodiment 1.

As illustrated in FIG. 2, the feature storage unit 21 stores, by user ID, data (feature data) indicating the features of each user. The user ID is an ID whereby each user is uniquely identified. The feature data stored in the feature storage unit 21 can be roughly divided into personal information, personality information, and interest information.

The personal information includes the name of the person indicated by the user ID (not limited to a formal names and may be a popular name, a nickname, a stage name, an alias, or the like), data of the voice print of that person (data used to recognize, by voice, the person as a speaker person), data of a facial image of that person (data used to recognize the person by image), and the age, gender, language used, and the like of the user. Typically, the user registers this personal information, via the operation inputter 33 and/or the communicator 34, in the feature storage unit 21 of the conversation apparatus 100. However, a configuration is possible in which the feature acquirer 12 (described later) of the controller 10 acquires the personal information by analyzing the name, the age, the gender, the language used, and the like using well-known speech recognition, and stores this personal information in the feature storage unit 21.

The personality information is information, analyzed by the feature acquirer 12, that indicates the personality of a particular person. Specifically, the personality information is information that expresses, by element, the levels of elements that indicate personality (for example, calmness, honesty, kindness, compassion, and the like). The information indicating the personality of the person, as analyzed by the feature acquirer 12, is stored together with an analysis count as the personality information. While described later, the analysis count is the number of utterances (utterance count) by the user, and is used to calculate information (a data value) that represents the personality listed in the DATA ITEM NAME column.

The interest information is information, analyzed by the feature acquirer 12, that indicates the interests of a particular person. Specifically, the interest information is information that indicates the hobbies, preferences, and principles of the person. While not illustrated in FIG. 2, for the interest information, a variety of information (for example, "soccer league", "team A", "music", and the like) may be stored together with, as the analysis count, the number of utterances (utterance count) by the user, in the same manner as the personality information. Note that the utterance count is used to extract the variety of information.

Both the personality information and the interest information are typically acquired by the feature acquirer 12 and registered in the feature storage unit 21. However, a configuration is possible in which the user registers, via the operation inputter 33 and/or the communicator 34, the levels of the various elements that indicate personality, and the hobbies, preferences, and the like of each user in the feature storage unit 21.

The speech inputter 31 includes a microphone. The speech inputter 31 acquires data of speech (speech data) uttered by the user. By executing the program stored in the storage unit 20, the controller 10 can perform speaker person recognition using the voice print data of the speaker person, acquire utterances by speech recognition, and the like on the basis of the speech data acquired by the speech inputter 31.

The image inputter 32 includes a camera. The image inputter 32 can acquire data of an image (image data) of the surroundings, and can perform person recognition to identify a person from a face or the like included in the image. The camera includes a wide angle lens capable of capturing all of the surrounding in a single image. As such, image data of the surroundings in all directions can be acquired without moving the conversation apparatus 100.

The operation inputter 33 includes a switch, a touch panel, or the like. The operation inputter 33 acquires operation content data (control commands for the conversation apparatus 100 and the like) input by the user. For example, the user can input and register, from the operation inputter 33, a name, a popular name, a nickname, a stage name, an alias, or the like as the name of the user in the feature storage unit 21.

The communicator 34 is a wireless module that includes an antenna, and is for wirelessly communicating communication data with an external network of the like. In one example, the communicator 34 is a wireless module for carrying out short-range wireless communication based on Bluetooth (registered trademark). By using the communicator 34, the conversation apparatus 100 can acquire various information from an external server.

The sensor 35 includes an acceleration sensor that detects acceleration of the conversation apparatus 100. The sensor 35 detects acceleration that is generated as a result of the user touching or picking up the conversation apparatus 100. The sensor 35 transmits this acceleration to the controller 10 as acceleration data. The feature acquirer 12 uses the value of the acceleration detected by the sensor 35 to analyze and acquire personality of the user. Note that configurations are possible in which the sensor 35 includes sensors other than the acceleration sensor.

The display 41 includes a liquid crystal, an electroluminescence (EL), or similar display. The display 41 displays control commands input from the operation inputter 33 and the like.

The speech outputter 42 includes an audio speaker that converts electrical signals into sound (physical vibrations) and a well-known function that synthesizes speech. The utterance controller 14 inputs electrical signals to the speech outputter 42, and thus voice is output from the speech outputter 42. The speech outputter 42 can make utterances by speech synthesis. When synthesizing speech, the speech outputter 42 can output voices with different tones (for example, a happy voice, a sad voice, a business-like voice, and the like).

Next, the functional components of the controller 10 of the conversation apparatus 100 will be described. The controller 10 realizes the functions of the acquirer 11, the feature acquirer 12, the selector 13, and the utterance controller 14. The controller 10 performs utterances tuned to the user that is selected on the basis of the features (personality and the like) of the user. Additionally, when the controller 10 is compatible with multithreading functionality, the controller 10 can execute threads (different processing flows) in parallel.

The acquirer 11 acquires speech data, image data, operation content data, communication data, and acceleration data from the speech inputter 31, the image inputter 32, the operation inputter 33, the communicator 34, and the sensor 35.

The feature acquirer 12 acquires the features of each user stored in the feature storage unit 21. For example, from the feature data illustrated in FIG. 2, the feature acquirer 12 acquires, as the features of the user "Hanako" that has a user ID of "User_1", a personality in which "Calmness=1 and Honesty=1" (low calmness and low honesty). Moreover, the feature acquirer 12 acquires, as the features of the user "Taro" that has a user ID of "User_2", a personality in which "Calmness=10 and Honesty=8" (high calmness and high honesty).

The feature acquirer 12 analyzes, by a well-known method, the speech data and the image data that the acquirer 11 acquires from the speech inputter 31 and the image inputter 32 and, as a result, acquires the features of the people near the conversation apparatus 100. Specifically, the feature acquirer 12 identifies the speaker person using the speech data and the image data, analyzes the words, expressions, and volume and tone of speech from the speech data and, on the basis of this analysis, acquires the features of the speaker person. Then, the feature acquirer 12 writes the features that are analyzed and acquired to the feature storage unit 21. The "features of the person" analyzed and acquired by the feature acquirer 12 are roughly divided into personality information and interest information.

Figure 3:
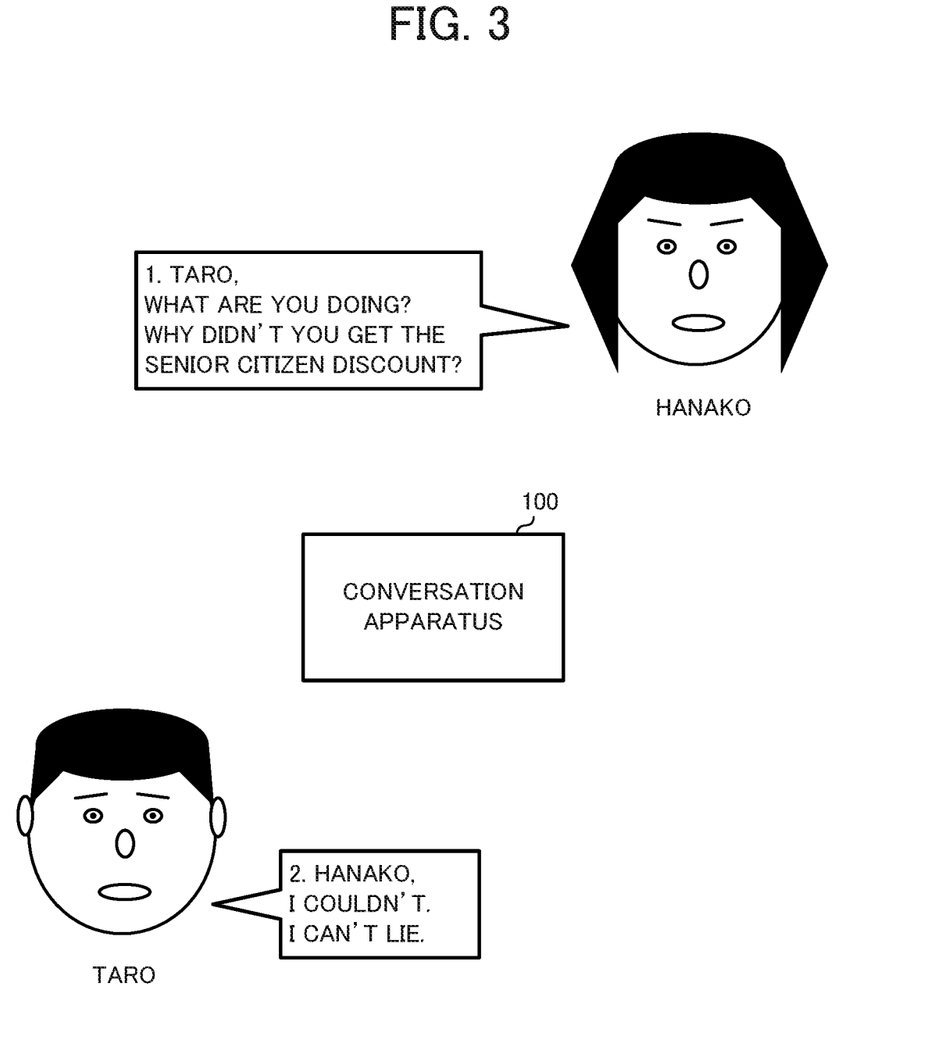
FIG. 3 is a drawing illustrating an example of a conversation taking place near the conversation apparatus according to Embodiment 1.

The personality information includes parameters that indicate the levels of various characteristics of a positive personality. For example, in FIG. 2, "calmness" that represents the level of calmness and "honesty" that represents the level of honesty are indicated as values from 0 to 10. While not illustrated in FIG. 2, the personality information also includes, for example, "kindness" that represents the level of kindness, "compassion" that represents the level of compassion, and the like. These parameter values are acquired on the basis of the results of an analysis, by the feature acquirer 12, of utterances included in a conversation between users taking place near the conversation apparatus 100, such as illustrated in FIG. 3.

Figure 4:
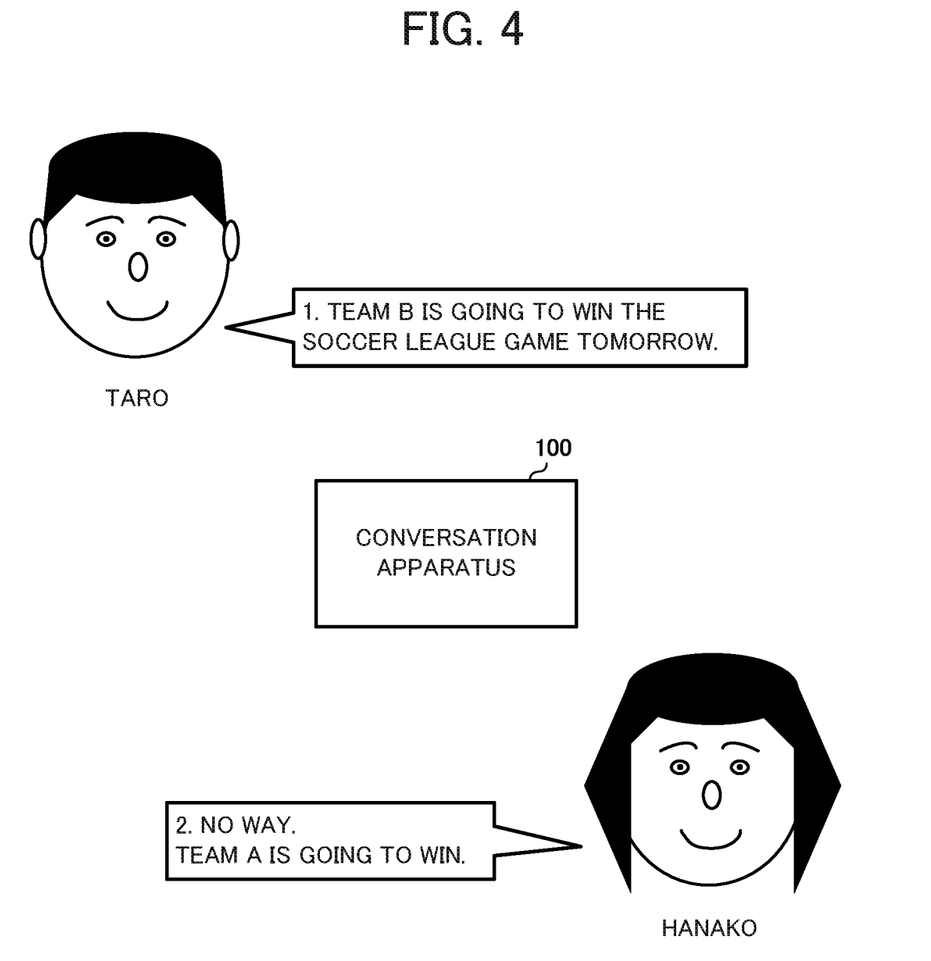
FIG. 4 is a drawing illustrating another example of a conversation taking place near the conversation apparatus according to Embodiment 1.

The interest information is information indicating the hobbies, the preferences, and the principles of each user. For example, in FIG. 2, "soccer league, team A, soap operas, entertainment shows . . . " are indicated as the interest information of the user "Hanako." Moreover, "soccer league, team B, music, guitar, band A . . . " are indicated as the interest information of the user "Taro." The interest information is acquired on the basis of results of an analysis, by the feature acquirer 12, of utterances included in a conversation between users taking place near the conversation apparatus 100, such as illustrated in FIG. 4. In the example illustrated in FIG. 2, the interest information consists only of information obtained by extracting key words from the utterances, but the interest information is not limited thereto. For example, thesaurus information such as "soccer league<soccer<sports", "team A<soccer league", "team B<soccer league", "soap opera<television show", and "guitar<musical instrument<music" may be included and stored as the interest information.

The selector 13 selects, from the users, the user that has the most desirable personality as the target user to tune to. The selector 13 selects the target user on the basis of the personality information of each user acquired by the feature acquirer 12. As described above, the personality information stored in the feature storage unit 21 are parameters that indicate the levels of various characteristics representing a positive personality. Accordingly, the user for which the total value of these parameters is the greatest is selected as the target user. Note that, here, the selection criterion for the target user is set as "the user that has the most desirable personality." However, the selection criterion is not limited thereto. A configuration is possible in which, opposite the example described above, the selector 13 selects the user that has the most undesirable personality as the target user to tune to. In this case, the user for which the total value of the parameters is smallest is selected as the target user.

The selector 13 may select the target user to tune to on the basis of information (feature information) other than the personality information, provided that this other information is stored in the feature storage unit 21. For example, the selector 13 may select the target user to tune to on the basis of gender, age, preferences, and the like. For example, "a female in her twenties that has interest in entertainment shows" may be selected as the target user to tune to. Additionally, the selector 13 may select the target user to tune to on the basis of both the personality information and the information other than the personality information. Furthermore, the selector 13 may randomly select a user as the target user or, for example, may disregard the personality information and select a user whose interest information includes a currently trending topic acquired from a server.

The utterance controller 14 performs control to cause the speech outputter 42 to utter a sentence tuned to the target user (sentence that matches the opinion, hobby, or the like of the user) selected by the selector 13.

The functional configuration of the conversation apparatus 100 is described above. Next, the feature acquisition processing and the utterance processing executed by the conversation apparatus 100 will be described. The conversation apparatus 100 is placed in an environment in which users live (in a room or the like). The conversation apparatus 100 analyzes the words and actions of the users to acquire the features of the users, and makes utterances tuned to a user selected on the basis of the features of the users. Feature acquisition processing is the process of analyzing the words and actions of the users to acquire the features of each user. Utterance processing is the process of making utterances tuned to the user selected on the basis of the features of the users. The feature acquisition processing may be constantly performed while the power of the conversation apparatus 100 is turned ON, or may be performed when the user inputs a command via the operation inputter 33 or the like. The utterance processing is performed when the user inputs an utterance command via the operation inputter 33 or the like. These two processes simultaneously progress as separate, parallel threads. Accordingly, the conversation apparatus 100 constantly performs the feature acquisition processing and, as such, can acquire (update) the features of the users in real-time.

Figure 5:
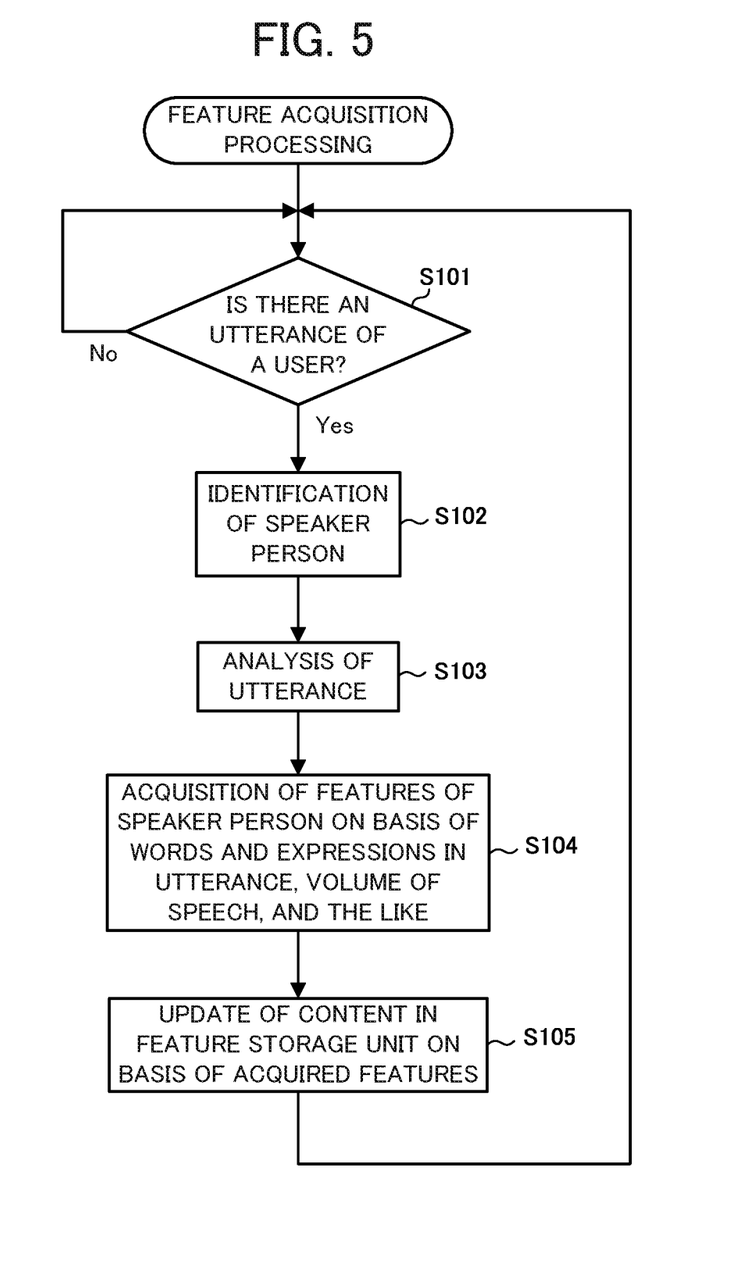
FIG. 5 is a flowchart of feature acquisition processing of the conversation apparatus according to Embodiment 1.

Next, the feature acquisition processing is described while referencing FIG. 5. First, the feature acquirer 12 uses the speech inputter 31 to determine whether there is an utterance by a user (step S101). If there is no utterance by a user (step S101; No), step S101 is executed and the feature acquisition processing waits until there is an utterance. If there is an utterance by a user (step S101; Yes), the feature acquirer 12 identifies the person that uttered (the speaker person) by comparing speech data input from the speech inputter 31 with the voice print data stored in the feature storage unit 21 (step S102). Note that, at this time, the feature acquirer 12 may identify the speaker person by comparing image data input from the image inputter 32 with facial image data stored in the feature storage unit 21.

Next, the feature acquirer 12 analyzes the content of the sentence that is uttered (content of uttered sentence) and the volume and the tone of the speech that is uttered (step S103), and extracts, by a well-known method, words and expressions used in the uttered sentence. Then, the feature acquirer 12 acquires the features of the speaker person on the basis of the analysis results of step S103, that is, on the basis of the words and the expressions used in the uttered sentence and the volume and the tone of the speech (step S104). Steps S103 and S104 are also called "acquisition steps." Note that, at this time, the feature acquirer 12 may acquire the features of the speaker person on the basis of the image data input from the image inputter 32 and the acceleration data input from the sensor 35.

Additional description of the method whereby the feature acquirer 12 acquires the features of the speaker person in step S104 is given below. Here, the features of the speaker person that the feature acquirer 12 acquires are the parameters that represent personality. There are four types of parameters that represent personality, namely calmness, honesty, kindness, and compassion. Of these, the value of calmness is determined by the intensity of the speech at the time of utterance and whether strong expressions (rough expressions of speech, command forms, and the like; for example, "What do you think you are doing!", bossy expressions, and the like) and calm expressions (relaxed expressions, polite language, and the like) are used in the uttered sentences. The calmness decreases (minimum: 0) if the speech at the time of utterance is intense or if many strong expressions are used in the uttered sentences. The calmness increases (maximum: 10) if the speech at the time of utterance is weak or many calm expressions are used in the uttered sentences. The honesty decreases if the uttered sentences include words such as "deceive" or "trick", which are used when lying or deceiving. The honesty increases if the uttered sentences include sentences that indicate that a person is honest such as "You should tell the truth" or "Lying is bad."

The kindness increases if the uttered sentences include kind expressions (for example, polite language). The kindness decreases if the uttered sentences include unkind expressions (for example, command forms, non-polite language). The compassion increases if the uttered sentences include expressions of compassion toward the other person (for example, "shall I do XXX for you", "let me YYY for you", and the like). The compassion decreases if the uttered sentences include expressions that demand something of the other person (for example "do XXX for me", "I want YYY", and the like).

If the value of the acceleration acquired by the sensor 35 when the user is using the conversation apparatus 100 is greater than a reference value, there is a high possibility that the user that touched or held the conversation apparatus 100 is a reckless person. As such, the feature acquirer 12 reduces the kindness of that user (the user that touched or held the conversation apparatus 100). The feature acquirer 12 may acquire the features of the users using the image data. For example, the image data of the faces of the users that are nearby may be input by the image inputter 32 and recognized using a well-known expression recognition technique. In this case, the kindness of the user is increased if a kind expression is recognized and decreased if a frightening expression is recognized.

Additional description of the method whereby the feature acquirer 12 acquires the features of the speaker person in step S104 is given above. Returning to FIG. 5, next, the feature acquirer 12 updates, on the basis of the features of the speaker person acquired in step S104, the content of the feature data stored in the feature storage unit 21 (step S105), and executes S101.

Additional description of the updating of the content of the feature data stored in the feature storage unit 21 of step S105 is given below. The features of the speaker person that are acquired by the feature acquirer 12 in step S104 are features limited to a single utterance and may not represent the actual features of the speaker person. As such, the values are updated so that the average value of the feature data, obtained from previous utterances of the speaker person, is stored in the feature storage unit 21.

Specifically, the value ("Data Value" in FIG. 2) of each parameter of the speaker person recognized in step S102 is multiplied by the previous utterance count ("Analysis Count" in FIG. 2) of that speaker person, and the parameter value acquired in step S104 is added to that value (product). Then, 1 is added to the utterance count (analysis count) of that speaker person, and a value obtained by dividing the value after adding the parameter by the utterance count (analysis count) after the addition of 1 is set as the updated parameter value (data value). Then, the updated parameter value and the utterance count (analysis count) after the addition of 1 are respectively written to the "Data Value" and the "Analysis Count" columns of the feature storage unit 21. As a result of this updating, the average of the previously acquired values is stored for each of parameter value (data value), and the possibility of representing the actual features of the speaker person can be increased.

Of course, there may be cases in which it is desirable to use the features of a user from a single utterance, without averaging the feature data. In such a case, the feature data of the single utterance is written to the "Data Value" column of the feature storage unit 21 without performing the process of averaging by the utterance count (analysis count). As a result, the feature data can be set according to the personalities, hobbies, and preferences of occasional users.

When averaging the feature data, if the analysis count is excessively large (for example, ten thousand or greater), the feature data will not significantly change (the averaged feature data will be substantially the same as the feature data obtained from the previous utterance data). As such, the content of the feature data (the data values and the analysis counts) stored in the feature storage unit 21 may be regularly (for example, every morning, weekly, monthly, or the like) cleared or the analysis count may be reduced. By doing this, the feature data can be made to quickly conform to a user when the personality, hobbies, and/or preferences of that user suddenly change.

As a result of the feature acquisition processing described above, the parameters indicating the features (personality) of each person analyzed by the feature acquirer 12 are stored in the feature storage unit 21. Next, the utterance processing is described while referencing FIG. 6. In the utterance processing, a flag variable SF that indicates whether the target user is selected or not is introduced. The flag variable SF is used for performing the process of selecting the target user to tune to when a conversation first starts or when a conversation between users restarts after being cut off.

Figure 6:
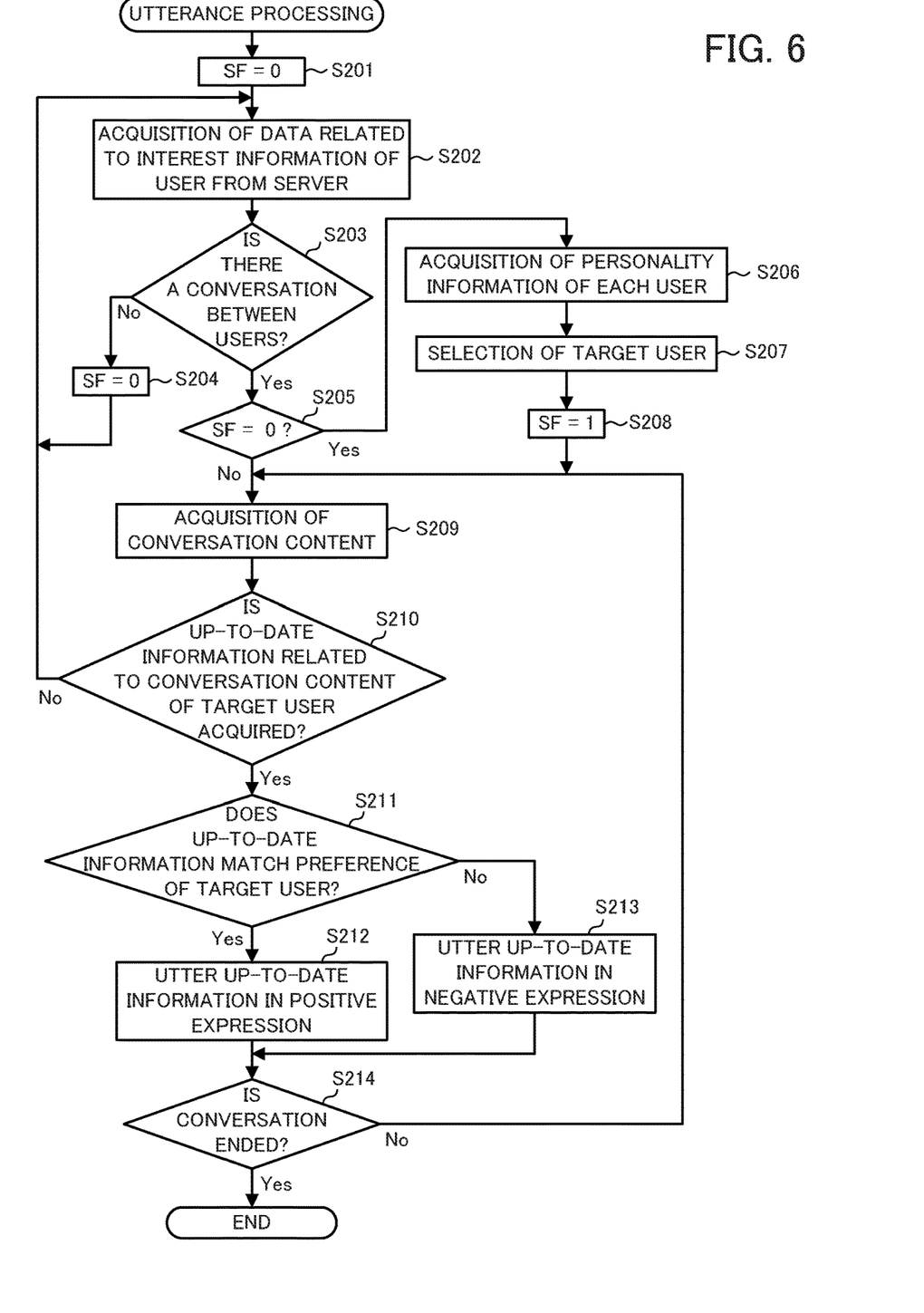
FIG. 6 is a flowchart of utterance processing of the conversation apparatus according to Embodiment 1.

First, the controller 10 initializes the flag variable SF to 0 (step S201). Next, the acquirer 11 references the interest information of all of the users stored in the feature storage unit 21 and acquires, via the communicator 34, up-to-date information related to the interest information from an external server (step S202). For example, in the example of the interest information illustrated in FIG. 2, the acquirer 11 acquires, from an external server, "news related to soccer leagues", "up-to-date information about television shows", "up-to-date information about music and musical instruments", and the like.

Next, using the speech inputter 31, the controller 10 determines whether a conversation is taking place between users that are near (step S203). If a conversation is not taking place (step S203; No), the controller 10 initializes the flag variable SF to 0 (step S204) and executes step S202. If a conversation is taking place (step S203; Yes), the controller 10 determines whether the flag variable SF is 0 (step S205). If the flag variable SF is not 0 (step S205; No), step S209 is executed.

If the flag variable SF is 0 (step S205; Yes), the feature acquirer 12 reads out the personality information of each user stored in the feature storage unit 21 (step S206). Step S206 is also called a "feature acquisition step."

The selector 13 selects, from the users, the target user to tune to on the basis of the personality information of each user read out by the feature acquirer 12 (step S207). Step S207 is also called a "selection step." In step S207, for example, the selector 13 calculates the sums, by user, of the personality information parameters of each user stored in the feature storage unit 21, and selects the user with the greatest sum as the target user. That is, the selector 13 selects the target user on the basis of comparison results obtained by comparing the personalities of each of the users. In the example of the personality information illustrated in FIG. 2, the sum of the personality information parameters of User_2 (Taro) is greater than the sum of the personality information parameters of User_1 (Hanako). As such, the selector 13 selects the User_2 (Taro) as the target user. Then, the controller 10 sets the flag variable SF to 1 in order to indicate that the target user is selected (step S208).

Next, the acquirer 11 acquires the conversation content from the speech inputter 31 (step S209). Then, the controller 10 determines whether the up-to-date information related to the conversation content of the target user, which is acquired by the acquirer 11 in step S209, has been acquired by the acquirer 11 in step S202 (step S210). If the up-to-date information has not been acquired (step S210; No), step S202 is executed. If the up-to-date information has been acquired (step S210; Yes), the controller 10 determines whether the acquired up-to-date information matches the preference of the user selected by the selector 13 (step S211).

If the acquired up-to-date information matches the preference of the user selected by the selector 13 (step S211; Yes), the utterance controller 14 controls the speech outputter 42 so as to utter that up-to-date information as a positive expression (step S212). For example, the utterance controller 14 controls the speech outputter 42 so as to utter the up-to-date information in a happy voice. Step S212 is also called an "utterance control step." In the example of the interest information illustrated in FIG. 2, the target user, namely User_2 (Taro), has preferences such as "liking soccer leagues", "liking team B", "liking music", "liking guitar", "liking band A", and the like. As such, for example, in a case in which up-to-date information that "team B won" is acquired in step S202, it is determined that the acquired up-to-date information matches the preference of the target user, and the utterance controller 14 controls the speech outputter 42 so as to utter this up-to-date information in a happy voice.

Meanwhile, if the acquired up-to-date information does not match the preference of the target user (step S211; No), the utterance controller 14 controls the speech outputter 42 so as to utter that up-to-date information as a negative expression (step S213). For example, the utterance controller 14 controls the speech outputter 42 so as to utter the up-to-date information in a sad voice. Step S213 is also called an "utterance control step." For example, in a case in which up-to-date information that "the concert of band A is canceled" is acquired in step S202, it is determined that the acquired up-to-date information does not match the preference of the target user, and the utterance controller 14 controls the speech outputter 42 so as to utter this up-to-date information in a sad voice.

Then, the controller 10 uses the speech inputter 31 to determine whether the conversation between the users that are near has ended (step S214). If the conversation is not ended (step S214; No), step S209 is executed. If the conversation is ended (step S214; Yes), the utterance processing is ended.

Figure 7:
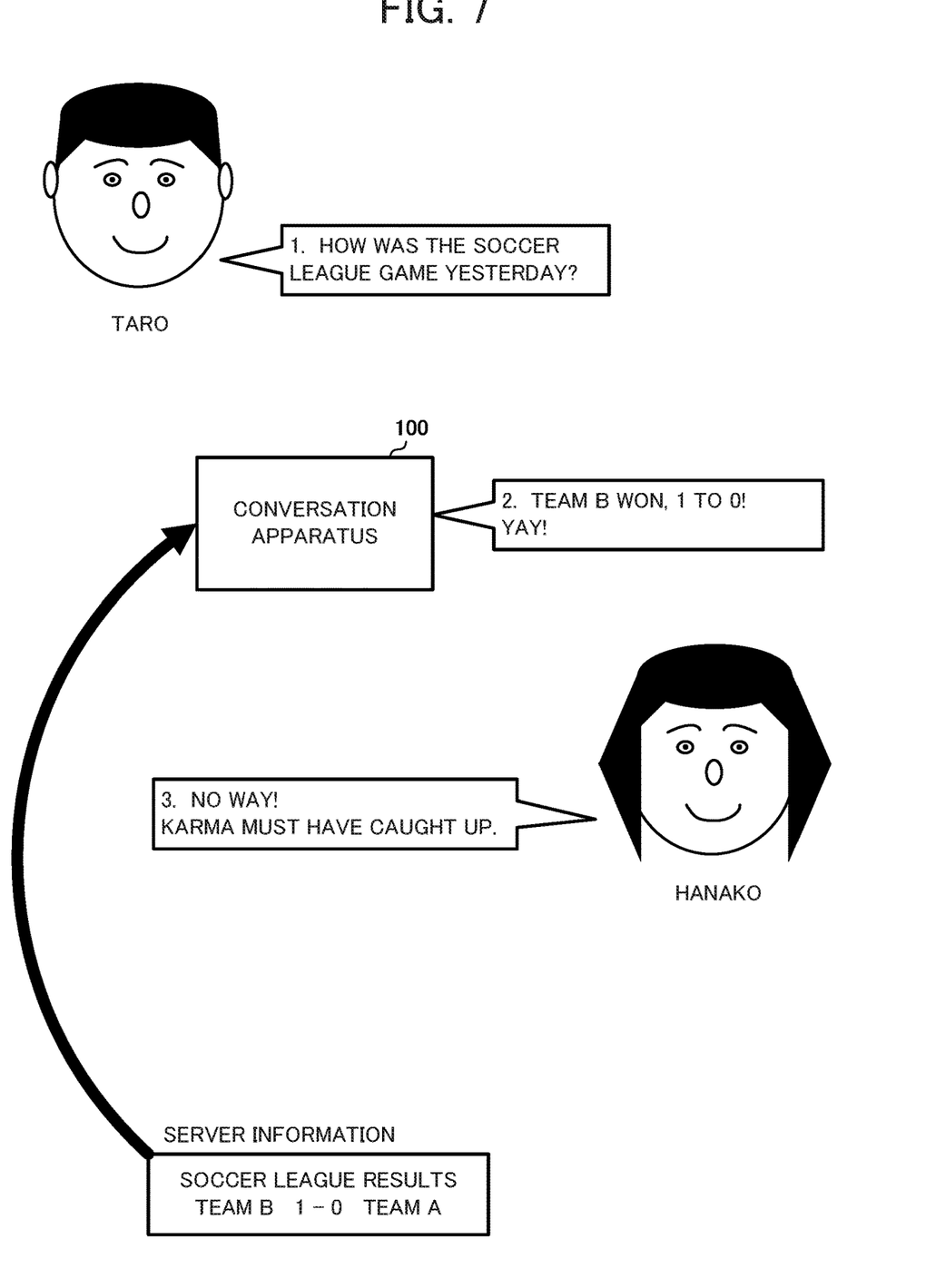
FIG. 7 is a drawing illustrating an example of a conversation between users in which the conversation apparatus according to Embodiment 1 makes an utterance as if participating in the conversation.

As a result of the utterance processing described above, the conversation apparatus 100 can make utterances that impart an impression that the conversation apparatus 100 has opinions and feelings and is participating in the conversation between the users, and can enliven the conversation between the users, as illustrated in FIG. 7. Moreover, the conversation apparatus 100 selects, as the target user to tune to, the person with high parameters of positive personality elements. As such, users that desire to be tuned to by the conversation apparatus 100 engage in good conversations in which positive personalities are naturally revealed. Therefore, the conversation apparatus 100 is also useful in the emotional education of children.

Embodiment 2

In Embodiment 1, the selector 13 performs processing to select, on the basis of the personality information of each user acquired by the feature acquirer 12, the user that has the most desirable personality as the target to tune to. However, the selection of the target to tune to is not limited thereto. For example, a configuration is possible in which a pseudo-personality of the conversation apparatus is stored as parameters in the storage unit 20, and a user that has a personality similar to the pseudo-personality of the conversation apparatus is selected as the target to tune to. Next, a conversation apparatus according to Embodiment 2, which is an example of such a case, will be described.

Figure 8:
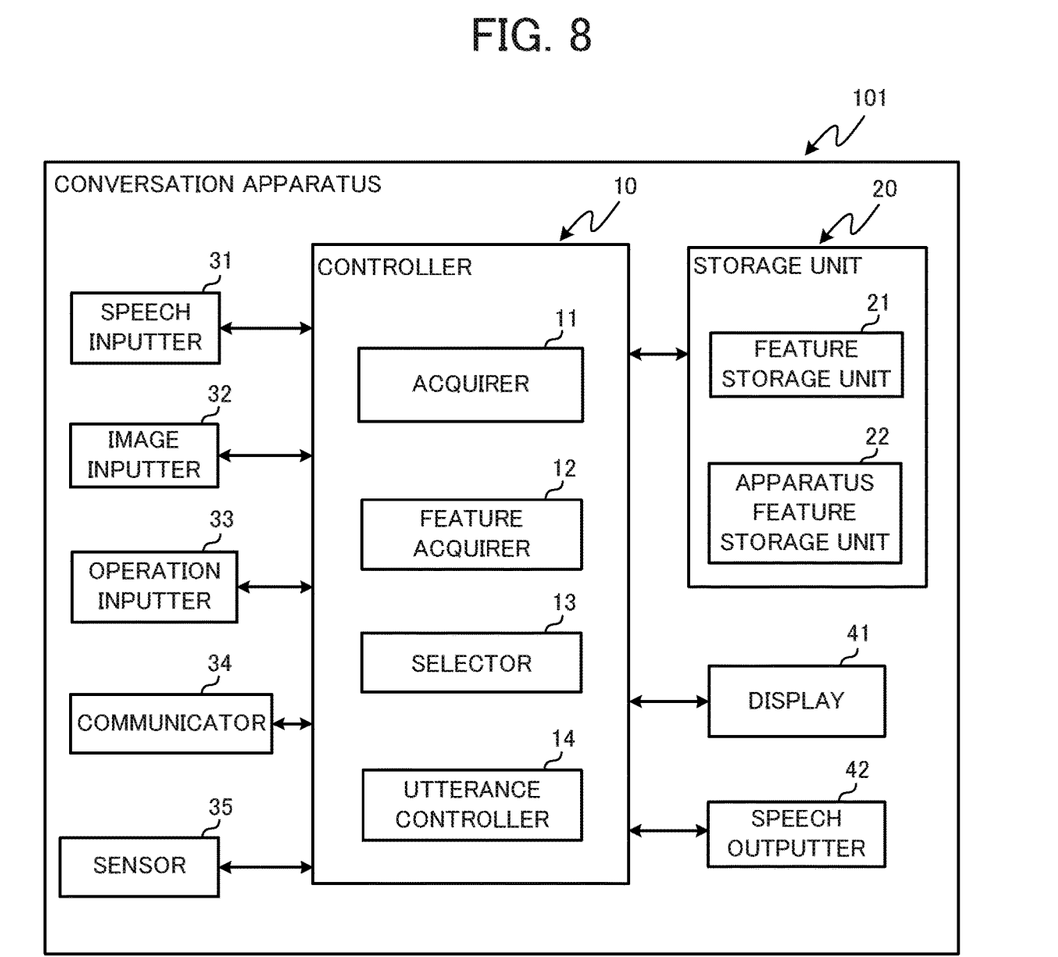
FIG. 8 is a drawing illustrating the functional configuration of a conversation apparatus according to Embodiment 2 of the present disclosure.
Figure 9:
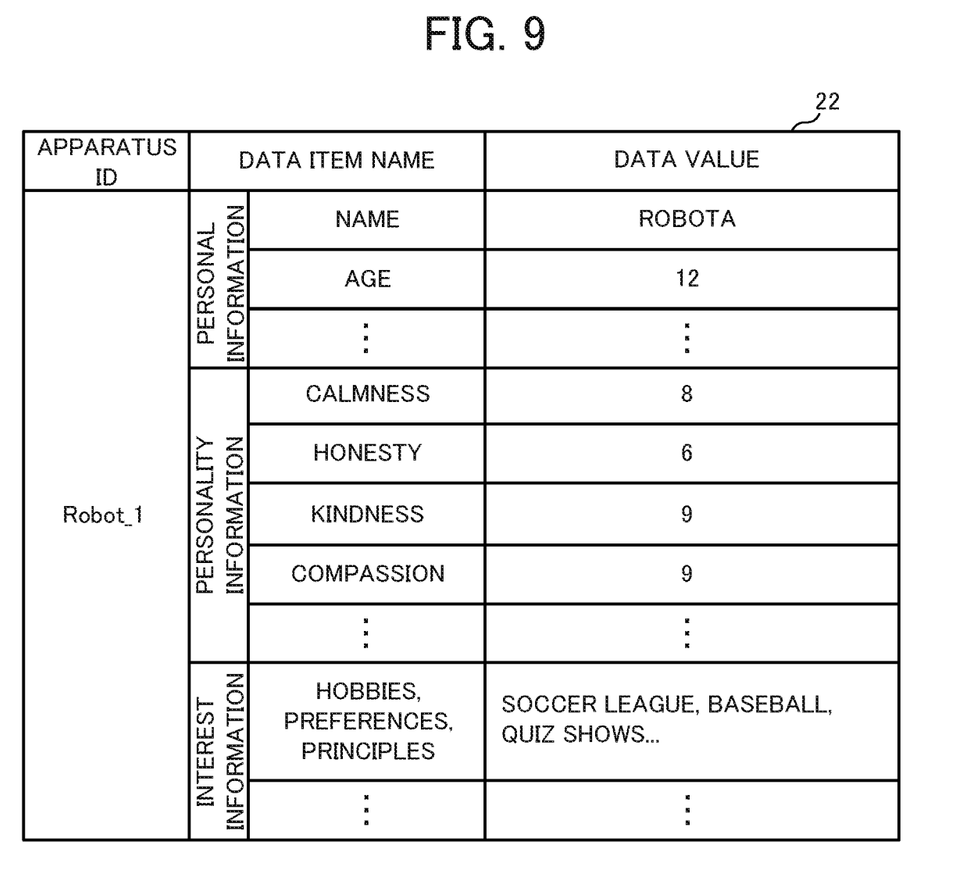
FIG. 9 is a drawing illustrating an example of data stored in an apparatus feature storage unit of the conversation apparatus according to Embodiment 2.

As illustrated in FIG. 8, a conversation apparatus 101 according to Embodiment 2 is obtained by adding an apparatus feature storage unit 22 to the configuration of the conversation apparatus 100 according to Embodiment 1. As illustrated in FIG. 9, the apparatus feature storage unit 22 stores personified feature information (a pseudo-personality and the like) of the conversation apparatus 101. In the example illustrated in FIG. 9, the name of the conversation apparatus 101 indicated by the apparatus ID "Robot_1" is "Robota", and the age of this conversation apparatus 101 is set as 12 years old. As a pseudo-personality, the personality information parameters are set as "calmness=8", "honesty=6", "kindness=9", and "compassion=9." As simulated interest items, the interest information is set to "soccer league, baseball, quiz shows . . . ."

The selector 13 of the conversation apparatus 101 according to Embodiment 2 selects, as the target to tune to, the user that has personality information that is the most similar to the personality information stored in the apparatus feature storage unit 22. An example of a method of selecting the user that has the personality information that is the most similar includes expressing the personality information of the users and the personality information of the conversation apparatus 101 as vectors of the same dimensionality and in which the various personality parameters are elements, normalizing the norm of each vector to 1, and calculating the inner product of two vectors that determines similarity. For example, the features can be expressed as a four-dimensional vector in which the first element is calmness, the second element is honesty, the third element is kindness, and the fourth element is compassion. In this case, for example, the personality information of the user "Hanako" is expressed as the vector (1, 1, 1, 0), the personality information of the user "Taro" is expressed as the vector (10, 8, 8, 7), and the personality information of the conversation apparatus 101 is expressed as the vector (8, 6, 9, 9).

Accordingly, the value of the inner product of the normalized (1, 1, 1, 0) and the normalized (8, 6, 9, 9) is less than the value of the inner product of the normalized (10, 8, 8, 7) and the normalized (8, 6, 6, 9). As such, it is clear that the similarity between the personalities of the user "Hanako" and the conversation apparatus 101 is less than the similarity between the personalities of the user "Taro" and the conversation apparatus 101. Therefore, the selector 13 selects the user "Taro", which has higher similarity, as the target user to tune to.

With the conversation apparatus 101 according to Embodiment 2, the user that has personality information that is highly similar to the pseudo-personality set in the conversation apparatus 101 is selected as the target user. As such, the degree of freedom related to the user to be selected can be increased and conversations between pluralities of users can be enlivened.

Note that, in Embodiment 2 described above, the user that has personality information that is highly similar to the pseudo-personality set in the conversation apparatus 101 is selected as the target user. However, the user selected as the target user is not limited thereto. A configuration is possible in which the conversation apparatus 101 selects a user that is the same age as the age set in the conversation apparatus 101 as the target user, or the conversation apparatus 101 selects a user that has the same hobbies and/or preferences as the simulated interest items set in the conversation apparatus 101 as the target user.

Modified Example 1

In the embodiments described above, the selector 13 selects the target user to tune to on the basis of the features (the personality information and the like) of the user. As such, there is a possibility that the same user will be consecutively selected as the target user. However, in such a case, other users may become offended because the conversation apparatus does not tune to those users in spite of the desires of those users. Next, Modified Example 1 is described. Modified Example 1 is an example in which a different user is selected when the same user is consecutively selected as the target user a predetermined number of times.

Figure 10:
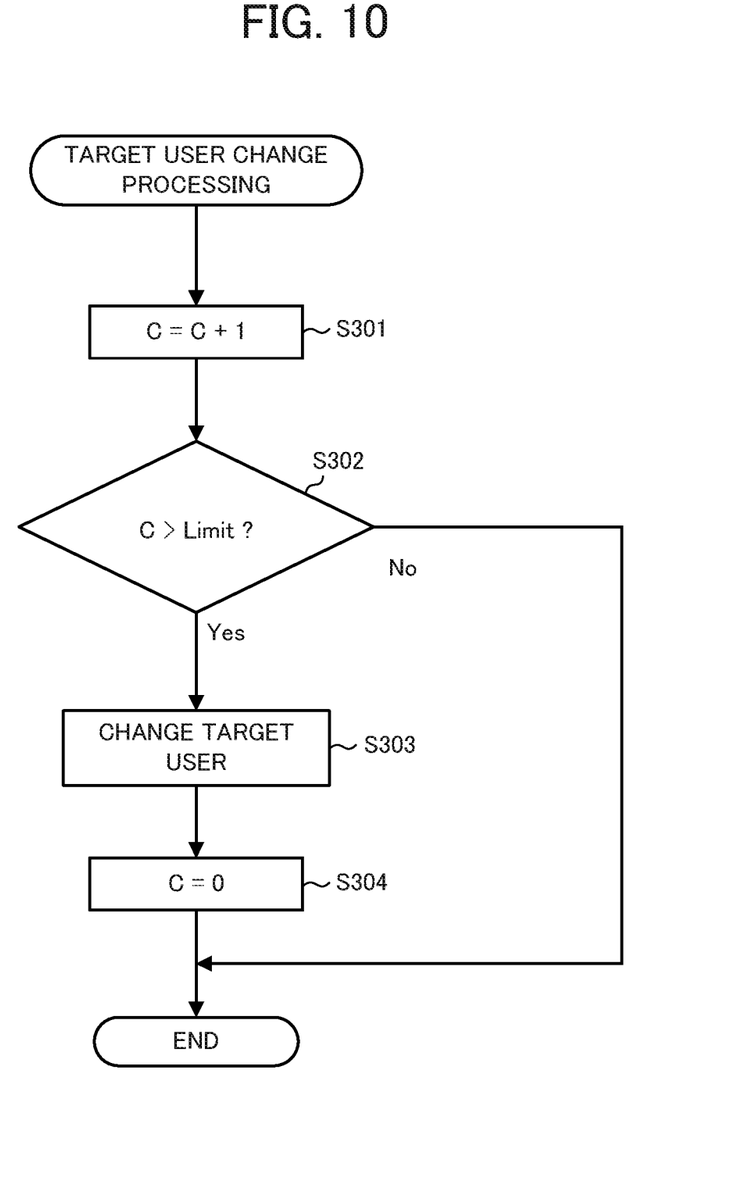
FIG. 10 is a flowchart of target user change processing of the conversation apparatus according to Modified Example 1.

In the utterance processing of Modified Example 1, target user change processing illustrated in FIG. 10 is performed immediately after a determination of No in step S205 of the utterance processing (FIG. 6) described above (immediately before step S209, after step S208, and after step S214; No). In the target user change processing, a variable C that counts the number of times the conversation apparatus 100 or 101 has uttered while the same person is selected as the target user, and a variable Limit that limits the number of times the conversation apparatus 100 or 101 utters while the same person is selected as the target user are introduced. Additionally, at the beginning (before step S201) of the utterance processing (FIG. 6), 0 is substituted for the variable C, and a consecutive utterance limit value (for example, 5) is substituted for the variable Limit. Note that, after the end of the conversation (after step S214; Yes), the variable C may be cleared (substituted with 0).

In the target user change processing, first, the controller 10 adds 1 to the variable C (step S301), and determines whether the value of the variable C is greater than the value of the variable Limit (step S302).

If the value of the variable C is less than or equal to the value of the variable Limit (step S302; No), the target user change processing is ended and step S209 of the utterance processing (FIG. 6) is executed. If the value of the variable C is greater than the value of the variable Limit (step S302; Yes), the selector 13 changes the currently selected target user (step S303). The method for changing the user is described later. Then, the controller 10 initializes the value of the variable C to 0 (step S304), ends the target user change processing, and executes step S209 of the utterance processing (FIG. 6).

Various methods are possible for the selector 13 to change the target user to a different user in step S303. A first method involves changing the target user to the runner-up user. In the case of this method, the selector 13 changes the user that would have been selected if the currently selected target user was not present to the target user.

A second method involves reversing the selection criteria. In a case in which Modified Example 1 is applied to Embodiment 1, the selector 13 calculates the sums, by user, of the personality information parameters of each user stored in the feature storage unit 21, and changes the user with the smallest sum to the target user. In a case in which Modified Example 1 is applied to Embodiment 2, the selector 13 changes the user that has personality information that is the least similar to the personality information stored in the apparatus feature storage unit 22 to the target user.

In Modified Example 1, it is possible to prevent the same user from being continuously selected as the target to tune to. As such, the variation of the target users that are selected increases, and conversations between pluralities of users can be enlivened even more.

Modified Example 2

In the embodiments described above, the feature acquirer 12 acquires the features of each user from the same feature storage unit 21. However, the present disclosure is not limited thereto. For example, a configuration is possible in which the storage unit 20 includes a short-term feature storage unit (not illustrated in the drawings) that stores the features of each user from only a single conversation. In this case, the target user is selected on the basis of the personality information acquired from the short-term feature storage unit, between step S209 and step S210 of the utterance processing (FIG. 6).

In Modified Example 2 in which this processing is performed, the frequency with which the selected user is switched during a conversation increases and, as a result, conversations between pluralities of users can be enlivened even more.

In the embodiments described above, the feature acquirer 12 analyzes the speech data and the image data that the acquirer 11 acquires from the speech inputter 31 and the image inputter 32 and, as a result, acquires the features of the people near the conversation apparatus 100 or 101. However, the present disclosure is not limited thereto. A configuration is possible in which the feature acquirer 12 acquires the features of each user stored in advance in the feature storage unit 21, without analyzing the speech data and/or the image data. Thus, in cases in which the feature acquirer 12 does not use the speech data and/or the image data when acquiring the features of the users, the conversation apparatus 100 or 101 need not include the speech inputter 31 and/or the image inputter 32.

In the embodiments described above, the selector 13 selects one user as the target user to tune to. However, a configuration is possible in which the selector 13 selects users as target users. For example, the users may be divided into groups of fans of the same teams, and users of the group to tune to may be selected, on the basis of the feature data of the users of the group, as target users.

In this case, for example, users of the group with average values that are greatest may be selected as the target users on the basis of the average values (for example, the average values of the sums of the parameters of the personality information) of the feature data of the users of the group. Alternatively, users of the group that have maximum values that are larger may be selected as the target users on the basis of maximum values (minimum values) of the feature data of the users of the group.

Moreover, for the determination of whether the acquired up-to-date information matches the preferences of the selected target users, a determination may be performed as to whether the acquired up-to-date information matches a preference that appears in the interest information of the users (for example, appears greater than or equal to a reference appearance rate (for example, appears in the interest information of 50% of the target users)). Alternatively, a determination may be performed as to whether acquired up-to-date information matches the preference of the user with the greatest personality information parameter among the target users.

In the embodiments described above, the selector 13 selects the target user to tune to, and the utterance controller 14 performs the utterance tuned to the target user. However, the present disclosure is not limited thereto. A configuration is possible in which the selector 13 selects a user that is not to be tuned to as the target user, and the utterance controller 14 performs an utterance that is not tuned to the target user. In this case, for example, in step S207 of the utterance processing (FIG. 6), a user with a negative personality is selected as the target user not to be tuned to, and in steps S211 to S213 of the utterance processing (FIG. 6), the acquired up-to-date information is uttered in a positive expression when the up-to-date information does not match the preference of the target user, and is uttered in a negative expression when the up-to-date information matches the preference of the target user.

In the embodiments described above, the feature acquirer 12 uses the utterance content (uttered words, expressions, and the like) obtained by analyzing the speech data input by the speech inputter 31, the volume and tone of the speech, the facial expressions obtained by performing expression recognition on the image data input by the image inputter 32, the acceleration acquired by the sensor 35, and the like when acquiring the features (personalities) of the users. However, the information that the feature acquirer 12 uses is not limited thereto. A configuration is possible in which the feature acquirer 12 uses only a portion of these pieces of information (for example, only the uttered words, only the uttered words and the volume of the speech, or the like) to acquire the features (the personalities) of the users. Additionally, a configuration is possible in which the feature acquirer 12 uses, together with or in place of the information described above, other appropriate parameters (for example, blood types, birthdays (zodiac signs), or the like) to acquire the features (the personalities) of the users.

In the embodiments described above, the conversation apparatus 100 or 101 includes the sensor 35. However, in cases in which the feature acquirer 12 does not use the acceleration data when acquiring the features of the users, the conversation apparatus 100 or 101 need not include the sensor 35. Moreover, in cases in which the feature acquirer 12 does not use the image data when acquiring the features of the users, the conversation apparatus 100 or 101 need not include the image inputter 32.

The embodiments and the modified examples described above can be combined as desired. For example, it is possible to select the target user by appropriately (randomly, for example) choosing the target user selection method by the selector 13 according to Embodiment 1 or the target user selection method by the selector 13 according to Embodiment 2.

By providing the conversation apparatus 100 or 101 to a robot, the robot can make utterances as if participating in conversations between pluralities of users. In this case, conversations between users can be further enlivened by, for example, providing the robot with an endearing pet shape.

Note that, the various functions of the conversation apparatus 100 or 101 can be implemented by a computer such as a typical personal computer (PC). Specifically, in the embodiments described above, examples are described in which the programs, such as the feature acquisition processing and the utterance processing, performed by the conversation apparatus 100 or 101 are stored in advance in the ROM of the storage unit 20. However, a computer may be configured that is capable of realizing these various features by storing and distributing the programs on a non-transitory computer-readable recording medium such as a compact disc read-only memory (CD-ROM), a digital versatile disc (DVD), a magneto-optical disc (MO), a memory card, and universal serial bus (USB) memory, and reading out and installing these programs on the computer. Moreover, a computer may be configured that is capable of realizing these various features by distributing the programs via a communication network such as the internet, and reading out and installing these programs on the computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A conversation apparatus, comprising:
- a microphone configured to acquire a conversation between users as speech information;
- an audio speaker configured to output, as the speech information, an utterance to at least one of the users; and
- a processor configured to execute:
    - selection processing of, when the conversation between the users is acquired via the microphone as the speech information, (i) referencing a first storage storing information related to a feature of each of the users and (ii) selecting a target user to tune to from among the users based on the information related to the feature of each of the users; and
    - output control processing of outputting, from the audio speaker, as the speech information, the utterance in an expression adjusted for a preference of the target user selected in the selection processing, wherein:

the information related to the feature of each of the users includes information related to a personality of each of the users, the information related to the personality of each of the users including information related to at least one of calmness, honesty, kindness, and compassion of each of the users; and the processor is configured to, in the selection processing, (i) reference the first storage storing the information related to at least one of calmness, honesty, kindness, and compassion of each of the users and (ii) select the target user to tune to from among the users based on the information related to at least one of calmness, honesty, kindness, and compassion of each of the users.

2. The conversation apparatus according to claim 1, wherein:

the processor is configured to, in the output control processing, (i) reference a second storage storing information related to the preference of the target user selected in the selection processing and (ii) output, when content of the utterance matches the preference of the target user, the utterance as the speech information in a positive expression, and output, when the content of the utterance does not match the preference of the target user, the utterance as the speech information in a negative expression.

3. The conversation apparatus according to claim 1, wherein:

the processor is further configured to execute storage control processing of storing the feature of each of the users in the first storage, based on the speech information of the conversation between the users that is acquired via the microphone.

4. A conversation apparatus control method for controlling a conversation apparatus that includes a microphone for acquiring a conversation between users as speech information and an audio speaker for outputting an utterance to at least one of the users as the speech information, the method comprising:

when the conversation between the users is acquired via the microphone as the speech information, (i) referencing a first storage storing information related to a feature of each of the users and (ii) selecting a target user to tune to from among the users based on the information related to the feature of each of the users; and outputting, from the audio speaker, as the speech information, the utterance in an expression adjusted for a preference of the selected target user, wherein:

the information related to the feature of each of the users includes information related to a personality of each of the users, the information related to the personality of each of the users including information related to at least one of calmness, honesty, kindness, and compassion of each of the users; and said (i) referencing comprises referencing the first storage storing the information related to at least one of calmness, honesty, kindness, and compassion of each of the users and said (ii) selecting comprises selecting the target user to tune to from among the users based on the information related to at least one of calmness, honesty, kindness, and compassion of each of the users.

5. A non-transitory computer-readable recording medium that stores a program executable by a processor included in a conversation apparatus that includes a microphone for acquiring a conversation between users as speech information and an audio speaker for outputting an utterance to at least one of the users as the speech information, the program causing the processor to execute:

selection processing of, when the conversation between the users is acquired via the microphone as the speech information, (i) referencing a first storage storing information related to a feature of each of the users and (ii) selecting a target user to tune to from among the users based on the information related to the feature of each of the users; and output control processing of outputting, from the audio speaker, as the speech information, the utterance in an expression adjusted for a preference of the target user selected in the selection processing;

wherein:

the information related to the feature of each of the users includes information related to a personality of each of the users, the information related to the personality of each of the users including information related to at least one of calmness, honesty, kindness, and compassion of each of the users; and in said selection processing, said (i) referencing comprises referencing the first storage storing the information related to at least one of calmness, honesty, kindness, and compassion of each of the users and said (ii) selecting comprises selecting the target user to tune to from among the users based on the information related to at least one of calmness, honesty, kindness, and compassion of each of the users.

6. A conversation apparatus, comprising:

a microphone configured to acquire a conversation between users as speech information;

an audio speaker configured to output, as the speech information, an utterance to at least one of the users; and a processor configured to execute:

selection processing of, when the conversation between the users is acquired via the microphone as the speech information, (i) referencing a first storage storing information related to a feature of each of the users and (ii) selecting a target user to tune to from among the users based on the information related to the feature of each of the users; and output control processing of outputting, from the audio speaker, as the speech information, the utterance in an expression adjusted for a preference of the target user selected in the selection processing, wherein:

the information related to the feature of each of the users includes information related to a personality of each of the users; and the processor is configured to, in the selection processing, (i) reference the first storage storing the information related to the personality of each of the users and (ii) select, from among the users, as the target user, a user that has a most positive personality among the personalities of the users.

* * * * *